(12) United States Patent
Seurat Guiochet et al.

(10) Patent No.: US 7,373,874 B2
(45) Date of Patent: May 20, 2008

(54) PRESSURE-COOKING APPLIANCE HAVING A SINGLE CONTROL MEMBER FOR DECOMPRESSION AND FOR LOCKING/UNLOCKING

(75) Inventors: Claire Marie-Aurore Seurat Guiochet, Dijon (FR); Daniel Jean-Marie Anota, Dijon (FR); Eric Chameroy, Veronnes (FR)

(73) Assignee: Seb S.A. (FR)

( * ) Notice: Subject to any disclaimer, the term of this patent is extended or adjusted under 35 U.S.C. 154(b) by 0 days.

(21) Appl. No.: 10/998,313

(22) Filed: Nov. 26, 2004

(65) Prior Publication Data
US 2005/0132894 A1 Jun. 23, 2005

(30) Foreign Application Priority Data
Nov. 27, 2003 (FR) .................................. 03 13937

(51) Int. Cl.
*A23L 1/00* (2006.01)
(52) U.S. Cl. ........................ 99/337; 99/403; 220/314; 220/316; 220/912
(58) Field of Classification Search ................ 99/330, 99/342, 337, 338, 403–407, 339, 340; 126/369, 126/373.1, 384.1; 219/440, 401, 389.1; 220/314–316, 220/573.1, 203.01, 324, 325, 203.19, 203.22, 220/323, 378; 292/DIG. 11, 57, 58, 63–66, 292/139, 140, 251
See application file for complete search history.

(56) References Cited
U.S. PATENT DOCUMENTS

| | | | |
|---|---|---|---|
| 2,538,567 A * | 1/1951 | Jones .................... | 219/452.13 |
| 4,423,825 A | 1/1984 | Baumgarten ................. | 220/316 |
| 4,434,909 A * | 3/1984 | Ott ............................. | 220/316 |
| 4,717,041 A | 1/1988 | Elexpuru .................... | 220/316 |
| 5,442,998 A * | 8/1995 | Niese .......................... | 99/337 |
| 5,678,721 A * | 10/1997 | Cartigny et al. ............ | 220/316 |
| 6,019,029 A | 2/2000 | Chan ........................... | 99/337 |
| 6,257,124 B1 * | 7/2001 | Chen ........................... | 99/337 |
| 6,425,320 B1 | 7/2002 | Chameroy et al. .......... | 99/337 |
| 6,513,420 B1 * | 2/2003 | Park ............................ | 99/337 |
| 6,523,459 B1 * | 2/2003 | Chameroy et al. .......... | 99/337 |
| 6,604,453 B2 * | 8/2003 | Niese .......................... | 99/337 |

* cited by examiner

*Primary Examiner*—Timothy F. Simone
(74) *Attorney, Agent, or Firm*—Thomas, Kayden Horstemeymer & Risley, LLP

(57) ABSTRACT

The invention relates to an appliance for cooking food under pressure, the appliance comprising:
a bowl and a lid;
locking/unlocking means suitable for going between a locking position in which the lid (2) is locked relative to the bowl and an unlocking position; and
decompression means (6) for decompressing the vessel;
wherein said locking/unlocking means and said decompression means (6) are connected functionally to a single, common control member (7A), said control member (7A) being designed to be suitable for finding itself in a locking and decompression position in which the locking/unlocking means find themselves in their locking position, while the decompression means are activated. The invention is applicable to household appliances for cooking under pressure.

21 Claims, 3 Drawing Sheets

PRESSURE-COOKING APPLIANCE HAVING A SINGLE CONTROL MEMBER FOR DECOMPRESSION AND FOR LOCKING/UNLOCKING

CROSS-REFERENCE TO RELATED APPLICATION

This Application claims priority to copending French Patent Application entitled, "A Pressure-Cooking Appliance Having A Single Control Member For Decompression And For Locking/Unlocking," having Application No. FR-03 13937, filed on Nov. 27, 2003, which is entirely incorporated herein by reference.

The present invention relates to the general technical field of household appliances for cooking under pressure, such an appliance comprising a bowl and a lid designed to be locked onto the bowl to form a leaktight cooking vessel. Such an appliance serves to cook food contained in the bowl under steam pressure The present invention relates more particularly to a household appliance for cooking food under pressure, the appliance comprising:

bowl and a lid designed to be mounted on and locked onto said bowl to form a leaktight cooking vessel;

locking/unlocking means having jaws or segments, and suitable for going between a locking position in which the lid is locked relative to the bowl and an unlocking position; and decompression means for decompressing the vessel, which means are activatable regardless of the pressure level prevailing inside the vessel.

BACKGROUND OF THE INVENTION

Receptacles for cooking under pressure are known that comprise a bowl and a lid designed to be locked onto the lid by locking/unlocking means suitable for going between a locking position in which the lid is locked and an unlocking position.

Such known appliances are also generally provided with decompression means making it possible to cause the pressure inside the appliance to drop, in particular at the end of the cooking process, in order to open the lid under safety conditions that are acceptable for the user.

For such known appliances, the locking/unlocking means going from their locking position to their unlocking position (and vice versa) is controlled by a first control member which, for example, comprises two push buttons corresponding respectively to the locking operation and to the unlocking operation.

The decompression means are controlled by means of a second control member distinct from the first control member which controls the locking/unlocking means. The second member can, for example, be in the form of a rotary ring.

That multiplicity of control members makes known pressure cookers awkward to handle, in particular for a user who is used to cooking with conventional cooking pots that operate at atmospheric pressure.

Unlike a user of such cooking pots, the user of a pressure cooker seeking to separate the lid from the bowl at the end of a cooking cycle, must perform a plurality of distinct manipulations in a pre-established sequence.

Thus, a user of a prior art pressure cooker who wishes to open the pressure cooker at the end of cooking must firstly turn (actuate in rotation) the second control member in order to activate the decompression means, and then, once decompression is complete, must shift (actuate in translation) the first control member which is distinct from the second control member in order to unlock the lid.

In addition to it being necessary for the user to memorize that sequence of distinct operations, said sequence is even more restrictive since it forces users of conventional pressure cookers to know the functions of the various control buttons and sliders present on the pressure cooker, which is far from always being easy and intuitive.

In addition, the multiplicity and the diversity of the control members present on a conventional pressure cooker gives rise to mechanical designs that are relatively complex, and that involve numerous moving parts, which can give rise to non-negligible risks of wear and jamming, and to problems of reliability.

OBJECTS AND SUMMARY OF THE INVENTION

Objects assigned to the invention are therefore to remedy the various above-listed drawbacks, and to propose a novel household appliance for cooking food under pressure that is particularly simple and intuitive to use.

Another object of the invention is to propose a novel household appliance for cooking food under pressure that is extremely ergonomic to use.

Another object of the invention is to propose a novel household appliance for cooking food under pressure that limits the possibilities for the user to make mistakes in handling it.

Another object of the invention is to provide a novel household appliance for cooking food under pressure whose design and assembly are simplified.

Another object of the invention is to provide a novel household appliance for cooking food under pressure whose design is particularly compact.

Another object of the invention is to provide a novel household appliance for cooking food under pressure having an excellent level of safety in use.

Another object of the invention is to provide a novel household appliance for cooking food under pressure that procures an excellent compromise in terms of cooking speed and of decompression speed.

Another object of the invention is to provide a novel household appliance for cooking food under pressure that offers an excellent compromise in terms of cooking speed, of flexibility of use, and of safety.

The objects assigned to the invention are achieved by means of a household appliance for cooking food under pressure, the appliance comprising:

a bowl and a lid designed to be mounted on and locked onto said bowl to form a leaktight cooking vessel;

locking/unlocking means having jaws or segments, and suitable for going between a locking position in which the lid is locked relative to the bowl and an unlocking position; and decompression means for decompressing the vessel, which means are activatable regardless of the pressure level prevailing inside the vessel;

wherein said locking/unlocking means and said decompression means are connected functionally to a single, common control member, said control member making it possible to cause the lid to be locked onto and unlocked from the bowl, and to cause the vessel to be decompressed.

BRIEF DESCRIPTION OF THE DRAWINGS

Other features and advantages of the invention appear in greater detail on reading the following description with reference to the accompanying drawings which are given by way of non-limiting illustrative example, and in which.

MORE DETAILED DESCRIPTION

The appliance of the invention is designed to cook various kinds of food under pressure in a household context.

The appliance of the invention is thus a cooking utensil that is portable (i.e. that can be moved by hand) and independent.

Conventionally, the appliance of the invention is designed to be brought up to pressure exclusively under the effect of a heat source (integrated or external), without external pressure being provided.

Preferably, the cooking appliance of the invention is a pressure cooker.

Figure 1:
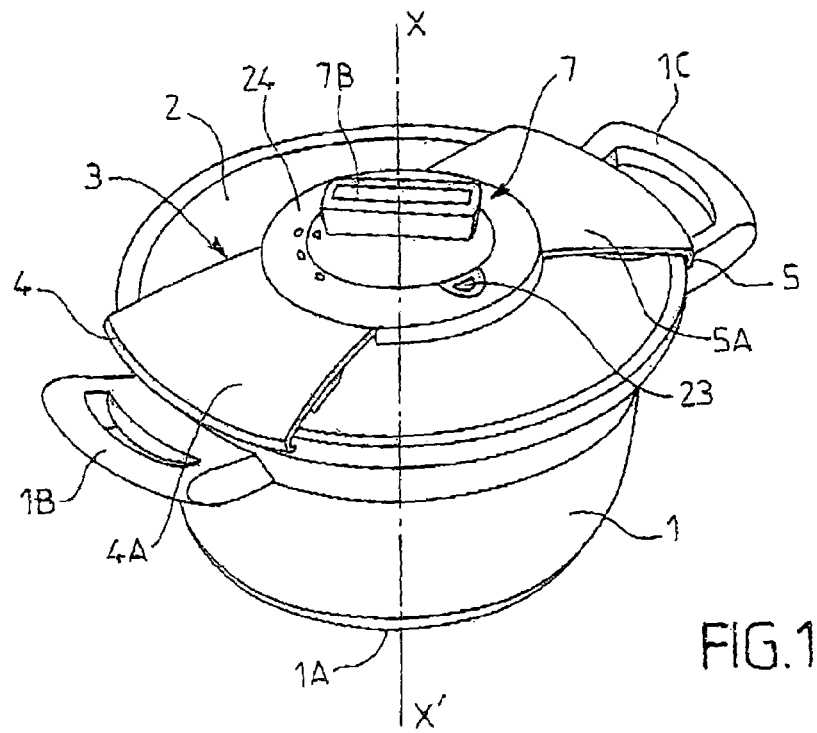
FIG. 1 is an overall perspective view of a household cooking appliance of the invention.

Conventionally, the cooking appliance of the invention includes a bowl 1 forming a cooking receptacle and preferably being circularly symmetrical about an axis X-X' (cf. FIG. 1).

Below, the adjective "axial" refers to the direction of said axis of symmetry X-X' which is substantially the same as the vertical direction when the appliance is operating normally.

In conventional manner, the bowl 1 is manufactured from a metal material such as stainless steel, and it is provided with a heat-conducting bottom 1A secured to the bowl, e.g. by hot stamping.

The bowl 1 can also be provided with members for picking it up such as handles 1B, 1C of which there are preferably two, and which are fixed to the bowl in diametrically opposite manner, for example (cf. FIG. 1).

The appliance of the invention also includes a lid 2 designed to be mounted on and locked onto said bowl 1 to form a cooking vessel that is substantially leaktight, i.e. sufficiently airtight to enable the pressure in the appliance to be increased.

The lid 2 is advantageously substantially disk-shaped, and its general diameter can, for example, be about 26 centimeters (cm), which corresponds to the standard applicable to stewpots.

The lid 2 can be locked onto or unlocked from the bowl 1 by locking/unlocking means 3 for locking/unlocking the lid 2 relative to the bowl 1 (shown in particular in FIG. 2) The locking/unlocking means 3 may be of any type known to the person skilled in the art, and they are conventionally suitable for going between a locking position for locking the lid 2 relative to the bowl 1 and in which the lid is secured to the bowl, and an unlocking position for unlocking the lid 2 relative to the bowl 1, and in which the lid can be separated from the bowl.

Advantageously, the locking/unlocking means 3 are arranged so that the locking and unlocking positions are predetermined positions, i.e. the locking/unlocking means 3 are designed to go nominally and discretely between a single locking position and a single unlocking position.

By way of example of such locking/unlocking means having predetermined locking and unlocking positions and usable in the context of the invention, mention can be made, for example, of locking/unlocking means having jaws (which corresponds to the variant shown in the figures), segments, or bayonet fittings.

However, the locking/unlocking means 3 are not limited to means arranged for the locking and unlocking positions to be predetermined positions. It is thus imaginable, without going beyond the ambit of the invention, for the locking/unlocking means 3 to be arranged so that the locking and unlocking positions are not pre-established, which applies, for example, to certain locking/unlocking means that involve progressively clamping the lid relative to the bowl (systems using conventional locking bars, for example).

Advantageously, the locking/unlocking means 3 of the appliance of the invention comprise at least one locking element 4, 5 for locking the lid 2 relative to the bowl 1, said at least one locking element 4, 5 being mounted to move substantially in radial translation relative to the lid 2 via corresponding drive means 4A, 5A between the locking position and the unlocking position.

Advantageously, said at least one locking element 4, 5 comprises a jaw designed to clamp together the peripheral edges of the bowl 2 and of the lid 1.

Said jaw can be in the form of a metal plate that has a U-shaped profile at its outer end, as is well known to the person skilled in the art.

Figure 2:
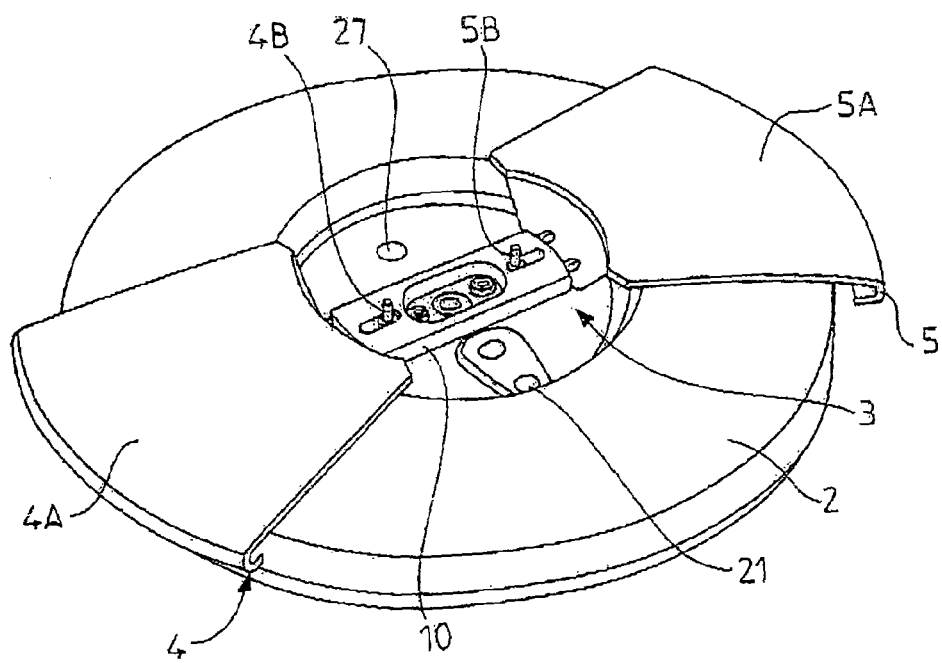
FIG. 2 is a perspective view of a detail of an embodiment of the locking/unlocking means of the lid of a cooking appliance of the invention.

Preferably, the appliance of the invention includes two locking elements, constituted by jaws 4, 5, said jaws being positioned diametrically opposite each other about the general axis of symmetry X-X' of the appliance (cf. FIGS. 1 and 2).

Advantageously, the drive means 4A, 5A for driving each jaw 4, 5 can consist in a corresponding drive arm, it being possible, for example, for each drive arm to be formed integrally with the corresponding jaw 4, 5, as is shown in FIGS. 1 and 2.

The locking/unlocking means 3 for locking/unlocking the lid 2 relative to the bowl are however not limited to a system having jaws and it can, for example, be based on a locking principle using segments. As is well known to the person skilled in the art, locking/unlocking means using segments consists of co-operation, in the manner of a latch bolt and keeper system, between firstly bars that are mounted to move in translation and that are secured to the lid and secondly corresponding complementary slots that are provided in the wall of the bowl. In the locking position, the bars are engaged in the corresponding slots to prevent any movement of the lid, whereas in the unlocking position, the bars are retracted and do not co-operate with the slots.

Advantageously, the household cooking appliance of the invention includes pressure-regulating means 6 mounted in leaktight communication with a hole 27 provided in the lid 2, and arranged to maintain the relative pressure (i.e. the measured pressure relative to atmospheric pressure) prevailing inside the vessel at a predetermined and substantially constant value referred to as the "operating pressure".

The general operating pressure of such pressure-regulating means 6 is well known to the person skilled in the art.

Thus, conventionally, the pressure-regulating means 6 comprise a pressure-regulating valve sensitive to pressure prevailing inside the vessel. Said pressure-regulating valve is mounted to move at least between:

resilient return and abutment position or "leaktight" position in which it shuts off communication between the vessel and the outside so long as the pressure prevailing inside the vessel is substantially no higher than the operating pressure; and at least one leakage position in which it puts the inside of the vessel into communication with the outside whenever the pressure inside the vessel exceeds the operating pressure.

Conventionally, a pressure-regulating valve can have a plurality of leakage positions, including an extreme leakage position which is an abutment position, the distance between the resilient return position and the extreme leakage position constituting the maximum stroke of the pressure-regulating valve.

Such a pressure-regulating valve thus aims to maintain the pressure in the vessel in the vicinity of a predetermined nominal level once the appliance has moved on from its transient pressure-increasing state and has reached its operating steady state.

The pressure-regulating means 6 can conventionally be constituted by a valve loaded by a weight or by a compression spring and mounted to move in a well between a leaktight low position and one or more leakage high positions.

As is well known to the person skilled in the art, the pressure-regulating means 6 can also be provided with a calibration system enabling the user to select a predetermined cooking pressure from a range of a plurality of operating pressure levels as a function, for example, of the type of food present in the pressure cooker.

Advantageously, the pressure-regulating means 6 are designed so that the operating pressure lies substantially in the range 10 kilopascals (kPa) to 30 kPa, and is preferably substantially equal to 20 kPa.

The applicant has established that selecting an operating pressure in the range 10 kPa to 30 kPa makes it possible to achieve an excellent compromise between firstly the cooking time and secondly the appliance decompression time when it is desired to go from the operating pressure to a lower pressure that is compatible with opening the lid under acceptable conditions for user safety.

However, the invention is not limited to a particular operating pressure level, and it can be implemented regardless of the operating pressure level.

In the invention, the household cooking appliance also includes activatable/deactivatable decompression means arranged so that, when they are activated, they allow the pressure prevailing inside the vessel to drop for the purpose of enabling the lid to be opened subsequently, i.e. of causing the locking/unlocking means to go from their locking position to their unlocking position.

To this end, the decompression means are activatable regardless of the pressure level prevailing inside the vessel, and in particular they are activatable when said pressure level corresponds to the operating pressure of the cooking appliance of the invention.

The functions of the decompression means are, in particular, as follows:

when the decompression means are deactivated, said decompression means allow substantially no leakage of steam from the inside of the vessel to the outside; and when the decompression means are activated, they put the inside of the vessel into communication with the outside in order to generate a reduction in the pressure prevailing inside the vessel, said pressure going from a first value corresponding to the operating pressure to a lower second value that is compatible with unlocking the lid under safety conditions acceptable for the user.

The decompression means can consist of any conventional means known to the person skilled in the art.

The decompression means are in particular shaped and dimensioned in a manner such as to enable decompression to take place without any scalding-hot cooking substances (food or cooking liquids) being sprayed dangerously to the outside.

According to an important characteristic of the invention, the locking/unlocking means 3 and the decompression means are connected functionally to a single and common control member 7, which member 7 makes it possible to cause the lid 2 to be locked onto and unlocked from the bowl 1, and to cause the vessel to be decompressed.

In other words, activation and deactivation of the decompression means, and the locking/unlocking means going from their locking position to their unlocking position (and vice versa), are caused by the same control member, so that the user of the pressure cooker can, by making a single action (e.g. by turning a handle or knob or by depressing a button), cause both decompression (regardless of the pressure level prevailing inside the vessel) and locking/unlocking.

Advantageously, the control member 7 is designed to be suitable for finding itself in a predetermined locking and decompression position in which said control member 7 co-operates with the locking/unlocking means 3 and with the decompression means so that the locking/unlocking means 3 find themselves in their locking position, while the decompression means are activated.

In other words, the locking/unlocking means, the decompression means, and the single control member 7 are arranged to co-operate so that, by manipulating the single control member 7, the user can cause decompression to be activated while also retaining full locking of the appliance.

The term "full locking" is used to indicate that the locking means are strictly in the locking position in which they are placed during the cooking operation.

When the locking/unlocking means 3 are arranged so that the locking and unlocking positions are predetermined positions, the locking and decompression position of the control member 7 corresponds to the predetermined locking position of the locking/unlocking means 3.

When the locking/unlocking means 3 are of a "continuous" type (e.g. locking/unlocking means having a progressive clamping system as in a pressure cooker having locking bars), the predetermined locking and decompression position of the control member 7 corresponds to the locking/unlocking means being held strictly in the locking position (corresponding to a level of clamping) in which it is placed for the purpose of performing the cooking operation.

As explained above, the control member 7 is preferably arranged so that its locking and decompression position is a predetermined position, i.e. pre-established and clearly identified as such for the user. This configuration facilitates use of the appliance by the user who thus knows with certainty that when the control member is placed in the predetermined locking and decompression position, the appliance is fully locked while the decompression means are fully activated, i.e. the sectional area of steam leakage from the inside of the vessel to the outside thereof is at its maximum or at least at its optimum. It is entirely imaginable for the decompression means 6 to have a plurality of leakage positions, activation of the decompression means then corresponding to one of the leakage positions, which is not necessarily the position allowing maximum sectional area for steam leakage. In other words, activating the decompression means 6 corresponds, in the sense of the invention, to putting the inside of the vessel into communication with the outside, regardless of the leakage flow rate.

Thus, the cooking appliance of the invention makes it possible for the user, by making a single manipulation of a single, common control member 7, to trigger decompression of the appliance while maintaining the lid locked, even though the control member 7 also controls locking/unlocking.

Advantageously, the single control member 7 is also designed to be suitable for finding itself in a preferably predetermined unlocking and decompression position in which said control member 7 co-operates with the locking/unlocking means 3 and with the decompression means so that the locking/unlocking means find themselves in their unlocking position, while the decompression means are activated.

This locking and decompression position makes it possible for the bowl 1 to be separated totally from the lid 2.

Advantageously, the single control member 7 is also designed to be suitable for finding itself in a preferably predetermined substantially leaktight locking position, in which the control member 7 co-operates with the locking/unlocking means 3 and with the decompression means in a manner such that the locking/unlocking means 3 find themselves in their locking position, while the decompression means 6 are deactivated.

This substantially leaktight locking position corresponds to the configuration of the appliance that enables cooking to take place.

Thus, the control member 7 can advantageously go between the three following predetermined positions:
 an unlocking and decompression position (a);
 locking and decompression position (b); and
 substantially leaktight locking position (c).

Preferably, the control member 7 has a sequential nature, i.e. it is designed to allow the following position changes only:
 going from position (a) to position (b);
 going from position (b) to position (c);
 going from position (c) to position (b); and
 going from position (b) to position (a).

In particular, going from position (c) to position (a), and going from position (a) to position (c) takes place by going via position (b), without necessarily stopping thereat if the pressure conditions inside the vessel so permit.

This makes it possible, in particular, to prevent the user from opening the lid directly without decompression when the pressure level prevailing inside the vessel is incompatible with safe opening of the appliance.

Advantageously, the control member 7 is designed so that, when it goes from its substantially leaktight locking position (c) to its locking and decompression position (b), it generates substantially no displacement of the locking/unlocking means 3. In other words, the control member 7 moving from its position (c) to its position (b) causes only activation of the decompression means 6, and substantially generates no displacement stress on the locking/unlocking means 3.

Advantageously, the control member 7 is mounted to turn relative to the lid, preferably about the axis X-X'.

The control member 7 preferably comprises a rotary intermediate plate 7A which is moved in rotation by control means 7B of the handle type that can be actuated manually by the user.

The handle 7B is preferably directly fixed to the intermediate plate 7A via fixing pins 8, 9 so as to achieve mechanical interfitting between the handle 7B and the intermediate plate 7A, which results in preventing any relative angular displacement between the handle 7B and the plate 7A (direct drive).

However, it is entirely imaginable, without going beyond the ambit of the invention, to provide a mechanical interface (not shown), e.g. a gearing-down or gearing-up mechanical interface, between the handle 7B and the intermediate plate 7A.

It is also imaginable, in place of a rotary control member 7B, to provide a control member that is suitable for being moved in translation, said movement in translation being transformed, via a mechanical interface (rack, ramp, link) provided for the purpose, into movement in rotation driving the intermediate plate 7A.

As shown in the figures, the rotary plate 7A can advantageously be mounted in a seat 26 itself designed to be mounted on the lid 2. The seat 26 is also designed to co-operate with a top casing 24 that peripherally caps the plate 7A (cf. FIG. 1).

The association of the casing 24 and of the seat 26 thus forms a single one-piece housing enclosing the intermediate plate 7A. Said housing can preferably be removable, i.e. it can be mounted on or removed from the lid 2 at will, with a view to washing the lid 2 in a dish washer, for example.

Advantageously, the control member 7 is connected functionally to the drive means 4A, 5A corresponding to each jaw 4, 5 so as to govern the movement of said drive means 4A, 5A, which, as mentioned above, are advantageously constituted by a drive arm 4A, 5A formed integrally with the corresponding jaw 4, 5.

Preferably, each drive arm 4A, 5A has firstly an outer end connected to the locking element, namely, for example, the corresponding jaw 4, 5, and secondly an inner end provided with an axial guide stud 4B, 5B designed to co-operate functionally with the drive member 7, e.g. by means of forced co-operation therewith.

The drive arms 4A, 5A are preferably mounted directly on the lid, and, in the vicinities of their inner ends, can have length sufficient to be superposed, at least in part, while they are being moved radially. In which case, the drive arms 4A, 5A are self-guided radially in each other, a first arm forming the male arm, and the other forming the female arm, the male arm sliding in the female arm.

Preferably, the linear and radial movement of the drive arms 4A, 5A are guided by additional guide means that are secured to the lid 2. In a preferred variant, the additional guide means are formed by a guide piece 10 which fits over the drive arms 4A, 5A over a portion of their length in the vicinity of their inner ends. In this way, each drive arm 4A, 5A is guided in translation relative to the lid 2.

Advantageously, the control member 7, and more precisely the intermediate plate 7A, is provided with at least one unlocking ramp 11A, 11B associated with each drive arm 4A, 4B.

Said at least one unlocking ramp 11A, 11B is arranged such that, when the control member 7 turns, under the action of the user, from its locking and decompression position to its unlocking and decompression position, the unlocking ramp 11A, 11B engages the axial stud 4B, 5B and pushes it towards the outside of the appliance, which causes the drive means 4A, 5A to move in radial translation from the locking position in which the lid is locked to the unlocking position in which the lid is unlocked.

Advantageously, the control member 7 is also provided with at least one locking ramp 12A, 12B associated with each drive arm 4A, 5A. Said at least one locking ramp 12A, 12B is arranged so that, when the control member 7 turns, under the action of the user, from its locking and decompression position, the locking ramp 12A, 12B engages the corresponding axial guide stud 4B, 5B, and pushes it horizontally towards the inside of the appliance, thereby causing the corresponding drive means 4A, 5A to move in radial translation from the unlocking position in which the lid is unlocked to the locking position in which the lid is locked.

As shown in the figures, the locking ramps 12A, 12B and the unlocking ramps 11A, 11B thus extend longitudinally in a horizontal plane, if it is considered that the vertical direction is defined by the axis X-X', and on a slant relative to the radial direction.

Advantageously, each axial guide stud 4B, 5B is formed by a peg extending substantially in the axial direction, while the unlocking ramps 11A, 11B and the locking ramps 12A, 12B are obtained by providing a corresponding oblong orifice 14, 15 in the thickness of the plate 7A in a direction that slants relative to the radial direction, said oblong orifice 14, 15 being designed to receive the corresponding axial guide stud 4B, 5B.

It can thus be understood that the control member 7 makes it possible to act in positive and reversible manner to cause the locking/unlocking means 3 to go from their unlocking position to their locking position, and vice versa.

Advantageously, each locking ramp 12A, 12B is extended by position-holding means 13A, 13B for holding the corresponding axial stud 4B, 5B in position, said position-holding means 13A, 13B being arranged so that, when the control member 7 turns, under the action of the user, from its locking and decompression position to its substantially leaktight locking position, or from its substantially leaktight locking position to its locking and decompression position, the corresponding axial stud 4B, 5B and thus the corresponding drive means 4A, 5A are held substantially stationary in the locking position in which the lid is locked.

Preferably, said at least one position-holding means 13A, 13B can be in the form of a circular arc shaped orifice 16, 17 provided in the thickness of the plate 7A, and extending the corresponding oblong orifice 14, 15.

Each circular arc shaped orifice 16, 17 forming the position-holding means 13A, 13B has its geometrical center coinciding with the center of rotation of the control member 7, which center belongs to the general axis of symmetry X-X'.

Advantageously, the pressure-regulating valve 6 includes an activatable engagement member 6A which, when it is activated, makes it possible to place the pressure-regulating valve 6 in the leakage position, so that said valve has two functions since it thus forms activatable decompression means.

More precisely, when they are activated, the engagement means 6A make it possible to place the valve 6 in the leakage position positively, by mechanically urging it. This configuration, which is independent from the other characteristics described herein, differs from the technical measures taken in the prior art, which measures generally make provision to act on calibration of the valve, e.g. by reducing the return force for returning the valve (e.g. by a spring relaxing), so as to make it sensitive to a pressure level that is well below the operating pressure.

Conversely, the invention does not reduce the return force, but rather it makes provision for an opposing force of higher magnitude to be applied against said return force, the opposing force being sufficient to guarantee that the inside of the vessel is put into communication instantaneously and permanently with the outside. Such provision makes it possible to guarantee fast and full decompression.

The activatable engagement means 6A can be in the form of a rod provided with a shoulder and extending in the axial direction, said shoulder forming an activation head.

Advantageously, the control member 7, and more particularly the intermediate plate 7A, is provided with a decompression ramp 18 designed to co-operate with the engagement means 6A so that, when the control member 7 turns, under the action of the user, from its substantially leaktight locking position to its locking and decompression position, the decompression ramp engages the engagement means 6A and pushes them axially upwards, thereby causing the pressure-regulating valve 6 to move from its leaktight position to its leakage position.

Preferably, the decompression ramp 18 projects from the plate 7A towards the outside of the vessel in the axial direction, and is in the form of two surfaces that slope relative to the horizontal, and that are designed to engage the head of the engagement means 6A, said sloping surfaces being separated by a notch provided through the entire thickness of the plate 7A so as to allow the rod of the engagement means 6A to pass through.

Advantageously, the decompression ramp 18 is extended by position-holding means 19 for holding the engagement means 6A in position, said position-holding means 19 being arranged so that, when the control member 7 turns, under the action of the user, from its locking and decompression position to its unlocking and decompression position, or from the unlocking and decompression position to the locking and decompression position, the engagement means 6A are held in the activated position, which corresponds to the pressure-regulating valve 6 being held in the leakage position, i.e. the decompression means are activated.

Preferably, the position-holding means 19 for holding the engagement means 6A in position are constituted by a bearing surface which is substantially horizontal (i.e. extending at a constant height) and which serves to enable the head of the engagement means 6A to bear against it, said surface making it possible to hold the engagement means 6A at the maximum height that it has reached after being subjected to the action of the decompression ramp 18.

In addition, both the decompression ramp 18 and also the position-holding means 19 extend in the horizontal plane along a circular arc whose center coincides with the center of rotation of the intermediate plate 7A. This enables them to act in the axial direction only, on the engagement means 6A, without urging said engagement means in another direction, in particular a radial direction.

However, it is entirely imaginable, without going beyond the ambit of the invention, for the decompression ramp 18 to be extended not by position-holding means 19 but rather by a ramp, so as to move the pressure-regulating valve from its leakage position to a position making it possible, for example, for an even higher leakage flow rate to be achieved.

In which case, the control member 7 going from its substantially leaktight locking position to its locking and decompression position makes it possible to place the valve 6 in a first leakage position, whereas the control member going from its locking and decompression position to the unlocking and decompression position makes it possible to place the valve 6 in a second leakage position, which differs from the first position by its leakage flow rate.

Advantageously, the cooking appliance of the invention includes safety opening means 20 sensitive to the pressure and/or to the temperature prevailing inside the cooking vessel.

Advantageously, the opening safety means 20 are designed to interact with the locking/unlocking means 3 so as to prevent the lid 2 from being unlocked relative to the bowl 1 when the pressure prevailing inside the vessel is greater than a predetermined value or "opening safety pressure" and/or when the temperature prevailing inside the vessel is greater than a predetermined value or "opening safety temperature".

Preferably, the opening safety means 20 are designed to prevent control member 7 from going from its locking and decompression position to its unlocking and decompression position so long as the pressure prevailing inside the vessel is higher than the safety pressure and/or so long as the temperature prevailing inside the vessel is higher than the safety temperature.

Advantageously, the opening safety means 20 comprise a pressure-gauge rod sensitive to the pressure prevailing inside the vessel, and mounted facing a hole 21 provided in the lid 2 to move between a low position, in which the rod 20 allows the lid 2 to be locked/unlocked relative to the bowl 1, and a high position (shown in FIGS. 3 to 5), in which the rod 20 interacts with the locking/unlocking means 3 in order to prevent the lid 2 from being unlocked relative to the bowl 1.

The general principle of such opening safety means is well known. They make it possible for positive opening safety to be provided by allowing the lid 2 to be released relative to the bowl 1 only when the pressure level prevailing inside the vessel reaches a level that is acceptable from the point of view of user safety. Preferably, the pressure-gauge rod 20 and the control member 7 are arranged relative to each other so that, when it is in the high position, the pressure-gauge rod prevents any movement in rotation of the control member 7 from its locking and decompression position to its unlocking and decompression position.

To this end, the intermediate plate 7A is provided with a margin 22 suitable for coming into abutment against the top end of the pressure-gauge rod 20 when the control member 7 turns towards its unlocking and decompression position.

Advantageously, the pressure-gauge rod 20 is designed to be held in the high position under the effect of the pressure prevailing inside the vessel when said pressure reaches a relative value or "rise pressure" lying substantially in the range 1.5 kPa to 4 kPa.

Preferably, the rod 20 is designed so that the rise is pressure is substantially equal to 3 kPa±0.5 kPa.

Even more advantageously, the rise pressure is substantially equal to 3.3 kPa.

Advantageously, the opening safety means 20 are designed to move downwards towards their low position when the pressure inside the vessel reaches a relative value or "descent pressure" that lies substantially in the range 1 kPa to 4 kPa, said descent pressure also being significantly lower than the rise pressure.

Preferably, the descent pressure substantially lies in the range 1.5 kPa to 4 kPa, and even more preferably substantially in the range 1.5 kPa to 2 kPa, or, for example, is substantially equal to 2.5 kPa±0.5 kPa.

In general, in the context of the invention, provision is made for the safety means 20 to be dimensioned and shaped so that the descent pressure is as close as possible to the rise pressure, while remaining lower than the rise pressure.

The opening safety means 20 are also designed so that their descent pressure is as high as possible within the limits of applicable standards, which standards currently stipulate a maximum threshold of 4 kPa for the descent pressure. By choosing a descent pressure that is high, e.g. lying in the range 1 kPa to 4 kPa, it is possible for the lid 2 of the cooking appliance to be opened more quickly, in comparison with prior art pressure cookers in which the descent pressure generally does not exceed 0.5 kPa.

However, obtaining such a high descent pressure generally makes the pressure-gauge rod 20 heavier.

Naturally, such an increase in weight is prejudicial to the speed with which the pressure-gauge rod 20 moves up into the high position while the appliance is being brought up to pressure, which can slow down the cooking cycle.

That is why, in the context of the invention, provision is advantageously made to equip the appliance with actuating means 25 for actuating the rod 20, said actuating means being arranged to make it possible to place the rod 20 in the high position, regardless of the value of the pressure prevailing inside the vessel.

In this way, it is the actuating means 10 themselves that, by acting mechanically, force the rod 20 into its high position, which is preferably a leaktight position by means of the presence of a sealing gasket (not shown), against which the rod 20 bears in order to achieve leaktight closure.

In order to force the pressure-gauge rod 20 to rise into the high position when the lid is locked, the control member 7 is provided with a cooking fast start ramp 25 forming actuating means, said ramp 25 being arranged so that, when the control member 7 turns, under the action of the user, from its locking and decompression position to its substantially leaktight locking position, the cooking fast start ramp 25 engages the pressure-gauge rod 20 and drives it by pushing it from its low position to its high position.

Figure 3:
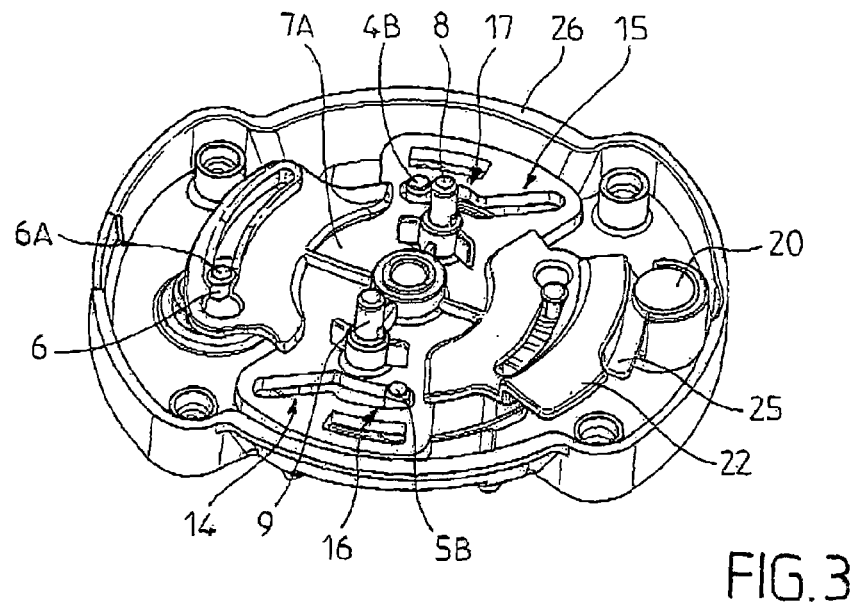
FIG. 3 is a perspective view of a detail of an embodiment of the control member of a cooking appliance of the invention.
Figure 4:
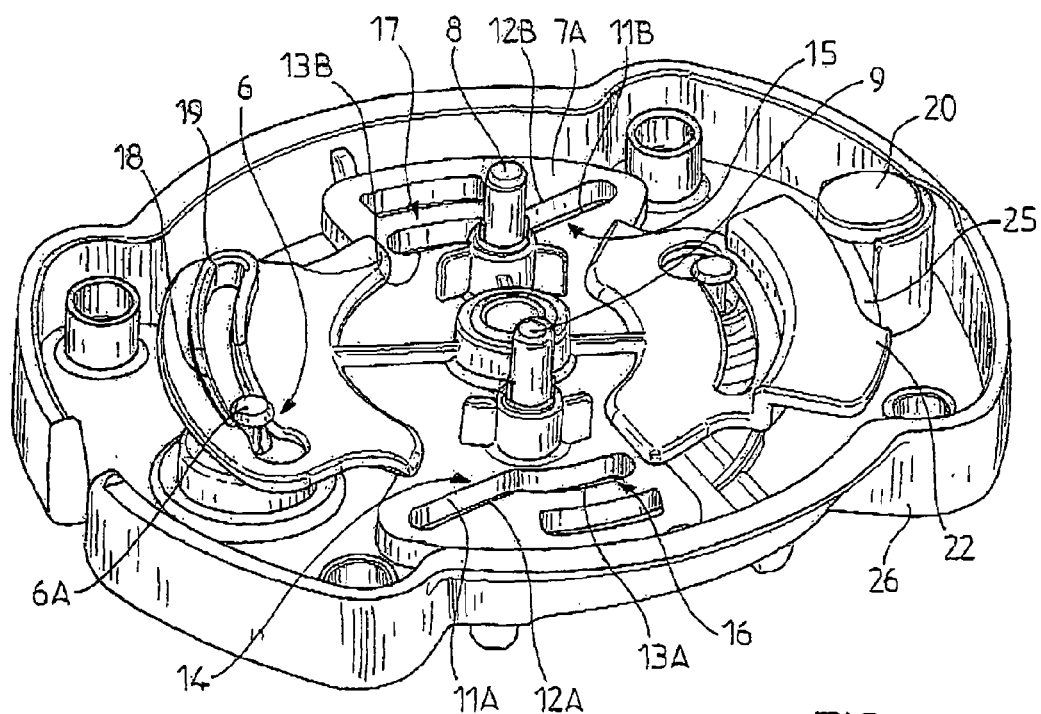
FIG. 4 is another perspective view showing the detail of the embodiment shown in FIG. 3.
Figure 5:
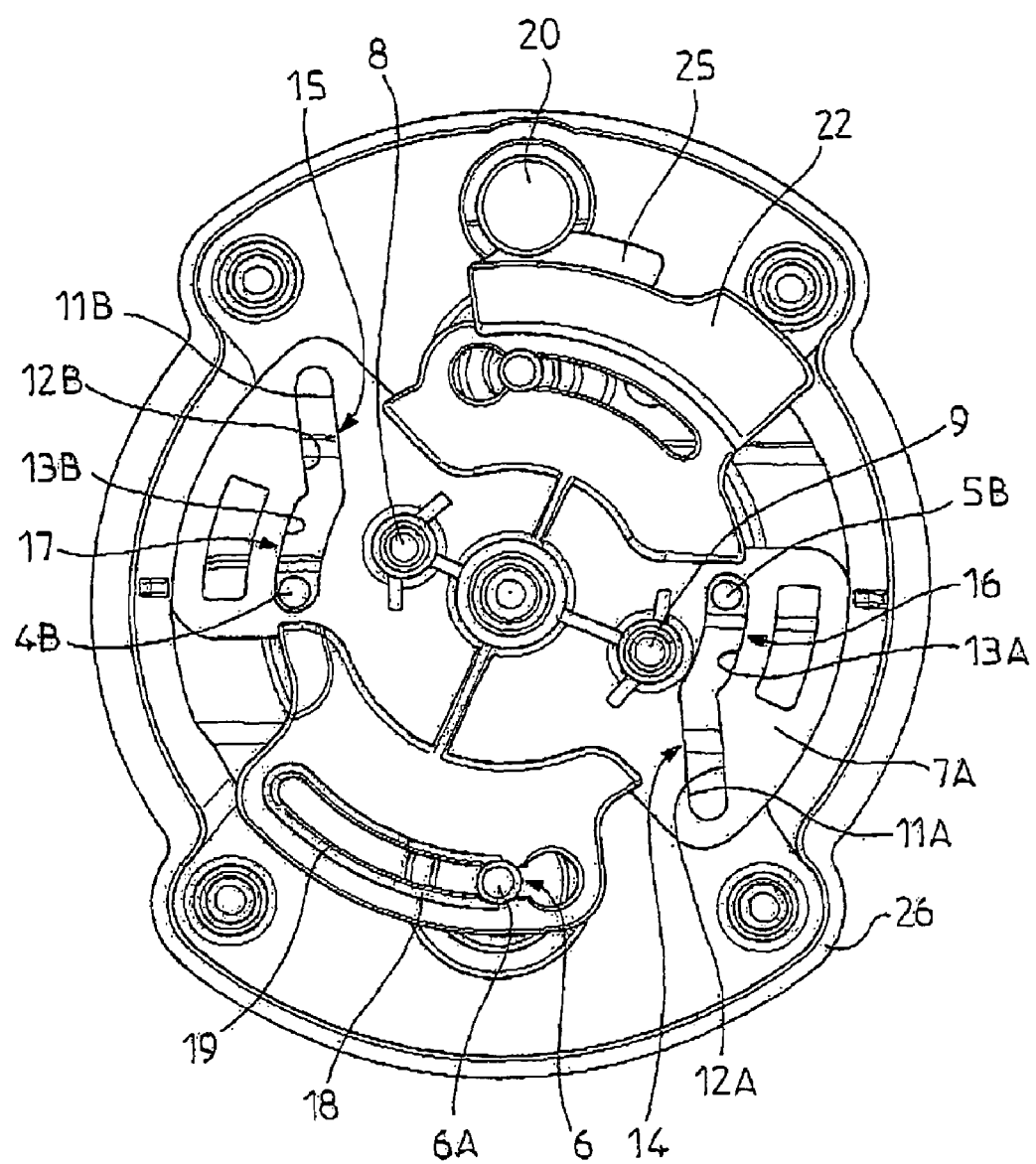
FIG. 5 is a plan view of the detail of the embodiment shown in FIGS. 3 and 4.

As shown in particular in FIGS. 3 to 5, the ramp 25 projects from the plate 7A, and extends in a vertical plane towards the inside of vessel, and on a slant relative to the axial direction X-X'.

Advantageously, the opening safety means 20 are also connected functionally to indicator means for indicating to the user whether or not it is possible to open the lid 2.

Preferably, the indicator means are of the visible type and are advantageously constituted by the top of the pressure-gauge rod 20 itself which, depending on its position (high or low), appears or does not appear to the eyes of the user via an opening 23 provided in the protective casing 24.

This provision makes it possible for the user to unlock the lid 2 without delay, since the user is informed of the very instant when the pressure conditions prevailing inside the vessel become compatible with safe unlocking.

Operation of the cooking appliance of the invention is described below.

Firstly, the user places the food in the bowl 1, i.e. directly therein or indirectly via a removable basket contained in the bowl 1.

The user then mounts the lid 2 on the bowl 1. At this time, the single control member 7 is in the unlocking and decompression position. The user then turns the control member 7 clockwise until the abutment position is reached that corresponds to the substantially leaktight locking position of the appliance. In going from its locking and decompression position to its leaktight looking position, the control member also goes through the locking and decompression position, but substantially without stopping at it.

With the control member placed in the substantially leakgtight locking position (shown in FIG. 5), the cooking appliance is subjected to a heater appliance of the hot plate type, and can thus be brought up to its operating pressure, which is regulated by a pressure-regulating valve 6.

At the end of the cooking cycle, the user turns the control member 7 counterclockwise until the margin 22 comes into abutment against the safety pressure-gauge rod 20, which is in the high position.

At this time, the control member is in the locking and decompression position.

Then, once the internal pressure prevailing inside the vessel descends below the descent pressure, the pressure-gauge rod 20 returns to its low position.

The user can then turn the handle 7B counterclockwise again until the unlocking and decompression position is reached that enables the user to open the lid safely.

What is claimed is:

1. A household appliance for cooking food under pressure, the appliance comprising:
    a bowl (1) and a lid (2) designed to be mounted on and locked onto said bowl (1) to form a leak-tight cooking vessel;
    locking/unlocking means (3) having jaws or segments, and moving between a locking position in which the lid (2) is locked relative to the bowl (1) and an unlocking position; and
    decompression means (6) for decompressing the vessel, which means are activatable regardless of the pressure level prevailing inside the vessel;
    wherein said locking/unlocking means (3) and said decompression means (6) are connected functionally to a single, common control member (7, 7A, 7B), said control member (7, 7A, 7B) making it possible to cause the lid (2) to be locked onto and unlocked from the bowl (1), and to cause the vessel to be decompressed.

2. An appliance according to claim 1, wherein the control member (7, 7A, 7B) is designed for finding itself in a predetermined locking and decompression position in which said control member (7, 7A, 7B) co-operates with the locking/unlocking means (3) and with the decompression means (6) so that the locking/unlocking means find themselves in their locking position, while the decompression means are activated.

3. An appliance according to claim 1, wherein the control member (7, 7A, 7B) is designed for finding itself in an unlocking and a decompression position, in which said control member (7, 7A, 7B) co-operates with the locking/unlocking means (3) and with the decompression means (6) so that the locking/unlocking means (3) find themselves in their unlocking position, while the decompression means (6) are activated.

4. An appliance according to claim 1, wherein the control member (7, 7A, 7B) is designed for finding itself in a substantially leaktight locking position, in which said control member (7, 7A, 7B) co-operates with the locking/unlocking means (3) and with the decompression means (6) so that the locking/unlocking means (3) find themselves in their locking position, while the decompression means (6) are deactivated.

5. An appliance according to claim 4, wherein: the control member (7, 7A, 7B) is designed for finding itself in a predetermined locking and decompression position in which said control member (7, 15 7A, 7B) co-operates with the locking/unlocking means (3) and with the decompression means (6) so that the locking/unlocking means find themselves in their locking position, while the decompression means are activated; and the control member (7, 7A, 7B) is designed so that when it moves from its substantially leaktight locking position to its locking and decompression position, it generates substantially no displacement of the locking/unlocking means (3).

6. An appliance according to claim 1, wherein the control member (7, 7A, 7B) is mounted to move in rotation relative to the lid (2).

7. An appliance according to claim 1, wherein the locking/unlocking means (3) comprise at least one locking element (4, 5) for locking the lid (2) relative to the bowl (1), said at least one element (4, 5) being mounted to move in radial translation relative to the lid (2), via corresponding drive means (4A, 5A), between the locking position and the unlocking position.

8. An appliance according to claim 7, wherein the control member (7, 7A, 7B) is connected functionally to the drive means (4A, 5A) so as to govern movement thereof.

9. An appliance according to claim 8, wherein the drive means (4A, 5A) comprise at least one drive arm guided in translation relative to the lid (2), and having firstly an outer end connected to the jaw (4, 5), and secondly an inner end provided with an axial guide stud (4B, 5B) serving to co-operate functionally with the control member (7 7A, 7B).

10. An appliance according to claim 9, wherein:
    the control member (7, 7A, 7B) is designed to be suitable for finding itself in a predetermined locking and decompression position in which said control member (7, 7A, 7B) co-operates with the locking/unlocking means (3) and with the decompression means (6) so that the locking/unlocking means find themselves in their locking position, while the decompression means are activated;
    the control member (7, 7A, 7B) is designed to be suitable for finding itself in an unlocking and a decompression position, in which said control member (7,7A, 7B) co-operates with the locking/unlocking means (3) and with the decompression means (6) so that the locking/unlocking means (3) find themselves in their unlocking position, while the decompression means (6) are activated;
    the control member (7, 7A, 7B) is mounted to move in rotation relative to the lid (2); and
    the control member (7, 7A, 7B) is provided with at least one unlocking ramp (11A, 11B) arranged so that, when the control member (7, 7A, 7B) turns from its locking and decompression position to its unlocking and decompression position, the unlocking ramp (11A, 11B) engages the corresponding axial guide stud (4B, 5B) and pushes it, thereby causing the drive means (4A, 5A) to move in translation from the locking position in which the lid (2) is locked to the unlocking position in which the lid is unlocked (2).

11. An appliance according to claim 9, wherein:
    the control member (7, 7A, 7B) is designed to be suitable for finding itself in a predetermined locking and decompression position in which said control member (7, 7A, 7B) co-operates with the locking/unlocking means (3) and with the decompression means (6) so that the locking/unlocking means find themselves in their locking position, while the decompression means are activated;
    the control member (7, 7A, 7B) is designed to be suitable for finding itself in an unlocking an decompression position, in which said control member (7, 7A, 7B) co-operates with the locking/unlocking means (3) and with the decompression means (6) so that the locking/ unlocking means (3) find themselves in their unlocking position, while the decompression means (6) are activated;

the control member (7, 7A, 7B) is mounted to move in rotation relative to the lid (2), and the control member (7, 7A, 7B) is provided with at least one locking ramp (12A, 12B) arranged so that, when the control member (7, 7A, 7B) turns from its unlocking and decompression position to its locking and decompression position, the locking ramp (12A, 12B) engages the corresponding axial guide stud (4B, 5B) and pushes it, thereby causing the drive means (4A, 5A) to move in translation from the unlocking position in which the lid (2) is unlocked to the locking position in which the lid (2) is locked.

12. An appliance according to claim 11, wherein:

the control member (7, 7A, 7B) is designed to be suitable for finding itself in a predetermined locking and decompression position in which said control member (7, 7A, 7B) co-operates with the locking/unlocking means (3) and with the decompression means (6) so that the locking/unlocking means find themselves in their locking position, while the decompression means are activated;

the control member (7, 7A, 7B) is designed to be suitable for finding itself in a substantially leaktight locking position, in which said control member (7, 7A, 7B) co-operates with the locking/unlocking means (3) and with the decompression means (6) so that the locking/unlocking means (3) find themselves in their locking position, while the decompression means (6) are deactivated; and the locking ramp (12A, 12B) is extended by position-holding means (13A, 13B) for holding the corresponding axial stud (4B, 5B) in position, said position-holding means (13A, 13B) being arranged so that, when the control member (7) turns, under the action of the user, from its locking and decompression position to its substantially leaktight locking position, or from its substantially leaktight locking position to its locking and decompression position, the corresponding axial stud (4B, 5B) and thus the corresponding drive means (4A, 5A) are held substantially stationary in the locking position in which the lid (2) is locked.

13. An appliance according to claim 1, further comprising pressure-regulating means (6) arranged to maintain the relative pressure prevailing inside the vessel at a predetermined and substantially constant value referred to as the "operating pressure".

14. An appliance according to claim 13, wherein the pressure-regulating means (6) comprise a pressure-regulating valve which is sensitive to the pressure prevailing inside the vessel and which is mounted to move at least between:

a resilient return and abutment position or "leaktight" position, in which it shuts off communication between the vessel and the outside so long as the pressure prevailing inside the vessel is substantially no higher than the operating pressure; and at least one leakage position in, which it puts the inside of the vessel into communication with the outside whenever the pressure inside the vessel exceeds the operating pressure.

15. An appliance according to claim 14, wherein the regulating valve (6) includes activatable engagement means (6A) which, when they are activated, make it possible to place the pressure-regulating valve (6) in the leakage position, so that said valve (6) also forms activatable decompression means.

16. An appliance according to claim 15, wherein:

the control member (7, 7A,7B) is designed to be suitable for finding itself in a predetermined locking and decompression position in which said control member (7, 7A, 7B) co-operates with the locking/unlocking means (3) and with the decompression means (6) so that the locking/unlocking means find themselves in their locking position, while the decompression means are activated;

the control member (7, 7A, 7B) is designed to be suitable for finding itself in a substantially leaktight locking position, in which said control member (7, 7A, 7B) co-operates with the locking/unlocking means (3) and with the decompression means (6) so that the locking/unlocking means (3) find themselves in their locking position, while the decompression means (6) are deactivated;

the control member (7, 7A, 7B) is mounted to move in rotation relative to the lid (2); and the control member (7, 7A, 7B) is provided with a decompression ramp (18) designed to co-operate with the engagement means (6A) so that, when the control member (7, 7A, 7B) turns from its substantially leaktight locking position to its locking and decompression position, the decompression ramp (18) engages the engagement means (6A) and pushes them axially upwards, thereby causing the pressure-regulating valve (6) to move from its leaktight position to its leakage position.

17. An appliance according to claim 1, further comprising opening safety means (20) sensitive to the pressure and/or to the temperature prevailing inside the vessel.

18. An appliance according to claim 17, wherein the opening safety means (20) are designed to interact with the locking/unlocking means (3) so as to prevent the lid (2) from being locked relative to the bowl (1) when the pressure prevailing inside the vessel is greater than a predetermined value or "opening safety pressure" and/or when the temperature prevailing inside the vessel is greater than a predetermined value or "opening safety temperature".

19. An appliance according to claim 18, wherein:

the control member (7, 7A, 7B) is designed to be suitable for finding itself in a predetermined locking and decompression position in which said control member (7, 7A, 7B) co-operates with the locking/unlocking means (3) and with the decompression means (6) so that the locking/unlocking means find themselves in their locking position, while the decompression means are activated;

the control member (7, 7A, 7B) is designed to be suitable for finding itself in an unlocking an decompression position, in which said control member (7, 7A, 7B) co-operates with the locking/unlocking means (3) and with the decompression means (6) so that the locking/unlocking means (3) find themselves in their unlocking position, while the decompression means (6) are activated; and the opening safety means (20) are designed to prevent the control member (7, 7A, 7B) from going from its locking and decompression position to its unlocking and decompression position so long as the pressure prevailing inside the vessel is greater than the safety pressure and/or so long as the temperature prevailing inside the vessel is greater than the safety temperature.

20. An appliance according to claim 17, wherein the opening safety means (20) comprise a pressure-gauge rod (20) mounted to move between a low position in which it allows the lid (2) to be locked/unlocked relative to the bowl (1) and a high position, in which it interacts with the locking/unlocking means to prevent the lid (2) from being unlocked relative to the bowl (1).

21. An appliance according to claim 1, that is constituted by a pressure cooker.

* * * * *